Patented June 11, 1929.

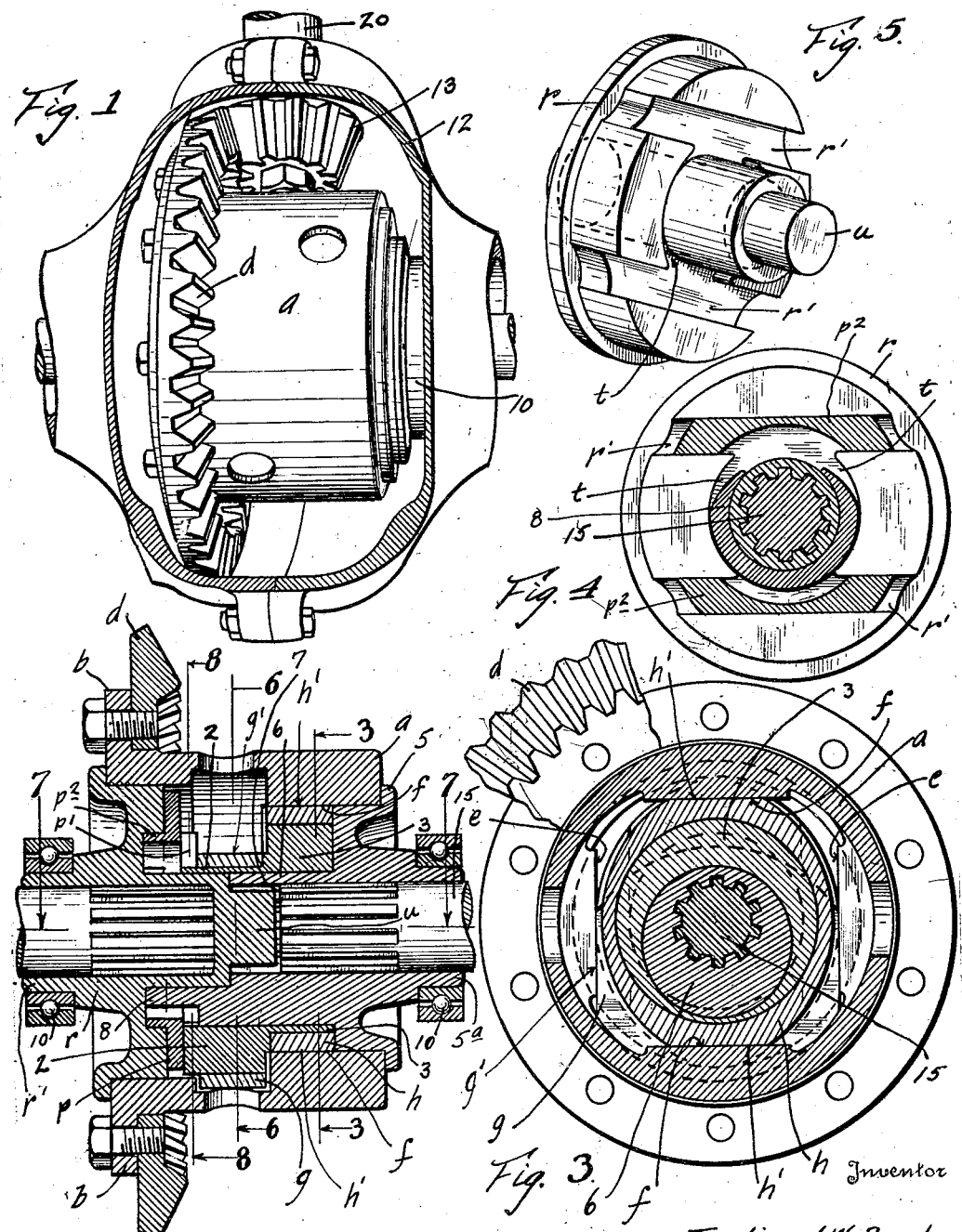

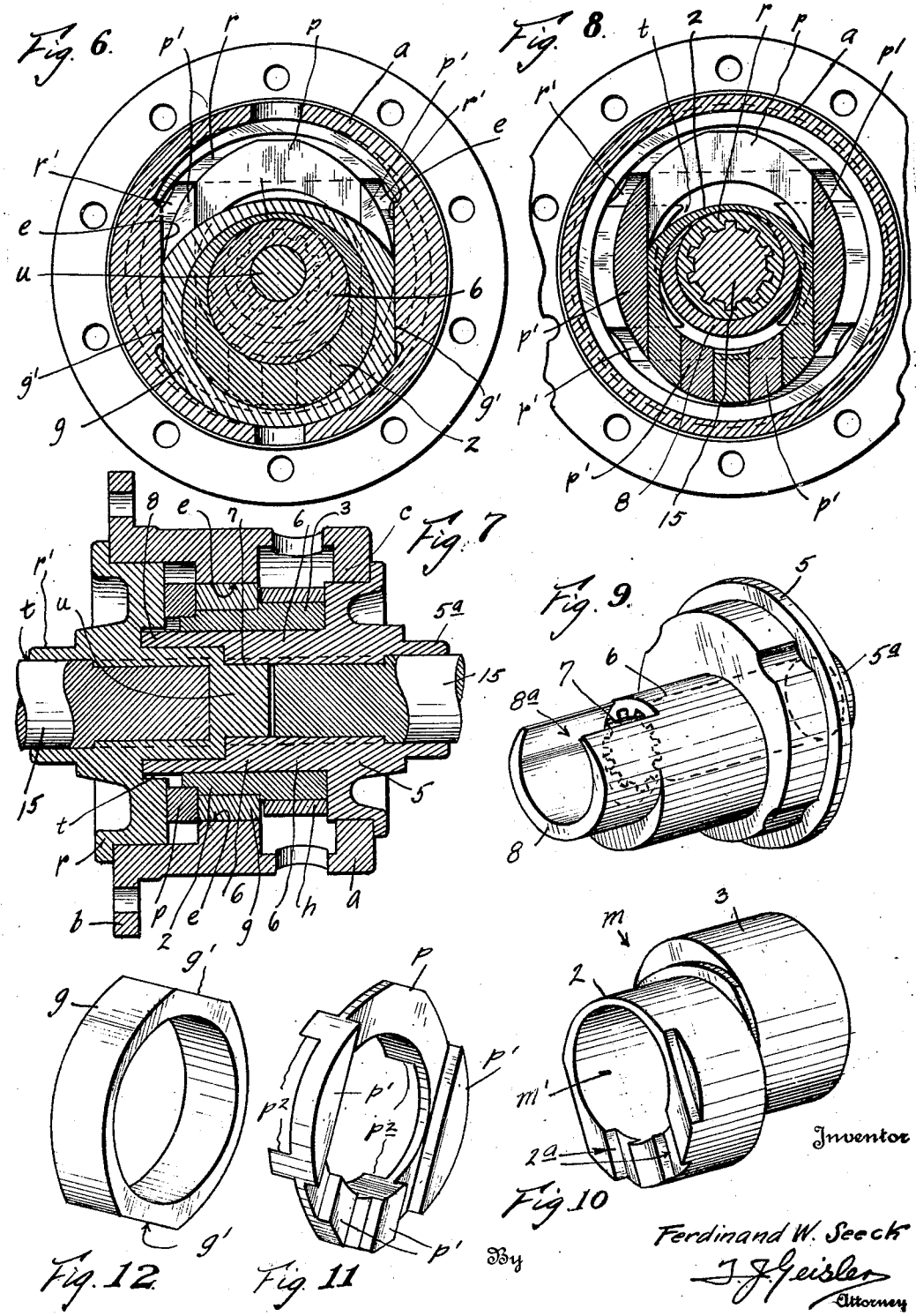

1,716,565

UNITED STATES PATENT OFFICE.

FERDINAND W. SEECK, OF LEBANON, OREGON.

DIFFERENTIAL MECHANISM.

Application filed October 29, 1927. Serial No. 229,608.

My invention relates to differential mechanisms.

The principal object of my invention is to provide a compact, strong, and efficient gearless differential, which is an improvement of a gearless differential, patented by me November 25, 1924, entitled Differential mechanism, and numbered 1,516,831.

Another object of my invention is to provide a one-piece casing for my differential, especially adapted to withstand radial thrusts of the enclosed mechanism, and to provide a differential mechanism which creates no lateral thrust, thus permitting the differential mechanism to be assembled and operated without fastening elements, such as bolts or screws, with the resultant gain in simplicity, durability, and economy of manufacture.

I attain this object by providing an outturned peripheral flange at one end of the casing, and an inturned peripheral flange at the other to strengthen and reenforce the casing and to provide additional bearing surfaces by means of the inturned flange, for the enclosed mechanism.

A further object of my invention is to provide an improved differential of such compact construction and arrangement that it may be contained within the circuit of the usual ring gear, the said ring gear being fastened to the outturned flange of the casing, and by this construction to provide a differential mechanism that may be installed within the usual differential housings as constructed for receiving the present gear differentials.

A still further object of my invention is to provide large outer bearing surfaces in order that my differential, due to its compact construction, may be mounted within the housing on anti-friction bearings.

A still further object of my invention is to provide an improved differential mechanism of standard size, adapted to be assembled at the factory and shipped and installed in the differential housing of a motor vehicle as constructed to receive the present gear differential.

These and other incidental features and the construction and operation of my invention are hereinafter described with reference to the accompanying drawings, in which:

Fig. 1 shows a side elevation of my differential mechanism with a part of the housing cut away to show the casing contained therein, and the ring gear and pinion which is fixed to a drive shaft;

Fig. 2 shows a central longitudinal section through the casing, and the mechanism contained therein, and illustrates the relative arrangement of the parts;

Fig. 3 shows a section taken on the line 3—3 of Fig. 2, looking in the direction of the arrows, and illustrates further details of construction;

Fig. 4 shows the interior face of one of the end plates and shows the axle and inner eccentric member in cross section;

Fig. 5 shows a perspective view of the other end plate and illustrates the large bearing surfaces;

Fig. 6 shows a section taken on the line 6—6 of Fig. 2, looking in the direction of the arrows, and illustrates further details of the assembled mechanism;

Fig. 7 shows a section taken on the line 7—7 of Fig. 2, looking in the direction of the arrows, and illustrates the relative arrangement and position of the axle ends, the inner eccentric members, and the end plates;

Fig. 8 shows a section taken on the line 8—8 of Fig. 2, looking in the direction of the arrows, and shows further details of the assembly of the various parts of my differential mechanism;

Fig. 9 shows a perspective view of the other end plate;

Fig. 10 shows a perspective view of the double eccentric;

Fig. 11 shows a perspective view of the coupling rings; and

Fig. 12 shows a perspective view of one of the bearing rings.

With reference to the drawings, my differential mechanism comprises a cylindrical casing $a$ provided at each end with laterally projecting peripheral flanges $b$ and $c$. The flange $b$ projects outwardly and is adapted to have a ring gear $d$ of the usual type fixed thereon. And the flange $c$ projects inwardly and provides larger bearing surface for the inner eccentric member hereinafter described. Both the flanges $b$ and $c$ serve to strengthen the casing against the radial thrusts of the mechanism, and to provide large bearing surfaces.

The inner surface of the casing $a$ is provided with two oppositely arranged flat surfaces $e$ of about half the width of the space between the flanges at each end of the casing, and other oppositely arranged flat surfaces $f$ are provided in the other half of the said space arranged at a ninety degree angle with the flat surfaces $e$.

Two concentric bearing rings $g$ and $h$, Fig. 12 are provided, the inner peripheries of which are circular, and the outer peripheries elliptical, the ends of the ellipses being cut off by flat surfaces $g'$ and $h'$, respectively. These bearing rings $g$ and $h$ are adapted to be seated inside the casing $a$ with their flat surfaces $g'$ and $h'$ slidably bearing against the flat surfaces $e$ and $f$, respectively, of the inner walls of the casing.

Within the said rings is arranged a double eccentric member $m$, Fig. 10, comprising two eccentric portions 2 and 3, formed with their eccentricities at 180 degrees with each other and provided with a common bore $m'$ concentric with the casing. The bearing ring $g$ is adapted to be mounted on the portion 2, and the bearing ring $h$ on the portion 3, and by this construction, as the eccentric member $m$ rotates, the said rings will move back and forth within the casing on their respective flat surfaces $e$ and $f$.

The lateral face of the portion 2 is grooved as at $2^a$, Fig. 10, and a circular coupling ring $p$, Fig. 11, provided with cooperating ribs $p'$ is adapted to be mounted adjacent the collar 3. The outer periphery of the coupling ring $p$ is formed elliptical similarly to the bearing rings $g$ and $h$ and is adapted to move laterally on the face of the said portion 2 as it rotates.

The other lateral face of the said bearing ring $p$ is provided with ribs $p^2$ normal with the ribs $p'$ on the opposite face. A disc $r$ is provided rotatably mounted in the end of the casing bearing the outturned flange $b$ and is formed with parallel grooves $r'$ arranged to receive the ribs $p^2$ of the coupling ring $p$, thus also providing for the lateral movement of the bearing ring $p$ on the inner face of the disc $r$ as the latter rotates.

The disc $r$ is concentrically bored as at $t$ and splined to receive the splined end of a divided rear axle shaft 15. A concentric groove $t'$ is cut about the wall of the said bore on the inner face of the disc $r$ and the bore $t$ is closed on its inner end by a cylindrical projection $u$, which closes the inner end of the bore forming a recess for the axle end.

A disc 5 is also provided in the other end of the casing provided with the inner shoulder $c$, Fig. 9, and with an inwardly projecting eccentric wall 6, housing a concentric bore 7, also splined to receive the other splined end of the divided rear axle shaft 15. An eccentric projection 8 is provided on the end of the wall 6 of less outside diameter than the said wall, and with a portion of its periphery cut away as at $8^a$, in which the projection $u$ on the disc $r$ will be received.

Both the discs $r$ and 5 are provided on their outer faces with hubs $r'$ and $5^a$, respectively, which provide bearing surfaces on which the assembled differential may be mounted on anti-friction bearings 10, within the usual differential housing 12, as shown in Fig. 1. A beveled pinion gear 13 fixed to the end of the drive shaft 20 of the motor vehicle in the usual manner, meshes with the said ring gear $d$ and motion is transmitted to the differential by this means.

I have provided oil circulation holes 21 in the casing $a$ for more effective lubrication.

By forming the casing $a$ in one piece and strengthening it by means of the flanges $b$ and $c$, I have so compacted my differential mechanism that sufficient space is provided in the differential housings as constructed to accommodate the present gear differentials, to permit the casing to be mounted on the anti-friction bearings 10, within the said housing.

In the operation of my improved differential, when both wheels are rotated at the same speed the differential mechanism will rotate as a unit, driven by the pinion gear 13 meshing with the ring gear $d$.

But as when turning a corner, the inside wheel will turn more slowly and the eccentric members will then commence to rotate and take up the lost motion of the inside wheel transmitting it to the outside wheel, and delivering the same proportionate amount of power to each wheel.

Or when one wheel is receiving better traction from the road surface than the other, and tends to turn faster, it will rotate the eccentric members, transmitting its power proportionately to the effectiveness of its traction, to the other wheel.

This condition may be best illustrated by the example of a motor vehicle equipped with the present gear differential, which is caught in a mud hole or on icy pavement, when one wheels encounters little or no resistance and is rotated very rapidly, the other wheel remaining stationary.

With my differential, however, the wheel receiving the most effective traction will receive a larger proportion of the power, since the wheel tending to slip over the road surface, and in so doing, rotating faster will transmit its power to the other wheel—with the result that the ability of a motor vehicle to pull itself out of a bad hole is considerably increased.

I claim:

1. In a differential mechanism of the character described, in combination with a driven shaft and a divided axle shaft, a casing, an exterior and interior flange on each end of said casing, respectively, discs mounted within said flanges, and hubs formed on the outer faces of said discs, antifriction bearings mounted on said hubs, the ends of said divided axle shaft fast in said discs, eccentric members, a coupling ring and bearing rings mounted on said discs within said casing, and a ring gear fixed to the said exterior flange.

2. In a differential mechanism of the character described, in combination with a driven shaft and a divided axle shaft, a casing, an exterior and interior flange on each end of said casing, respectively, discs mounted within said flanges, the ends of said divided axle-shaft fast in said discs, one of said discs provided with a concentric extension and with grooves on its inner side, the other disc provided with an eccentric wall on its inner side, a double eccentric member mounted over said extension and said wall, grooves provided on one end of said eccentric member, bearing rings provided on said double eccentric member, a coupling ring connecting said double eccentric member and the disc bearing said extension, said coupling ring provided with ribs on each side, the ribs on one side normal with those on the other, and outwardly projecting hubs on each of said discs, anti-friction bearings mounted on said hubs.

3. In a differential mechanism of the character described, in combination with a driven shaft and a divided axle shaft, a casing, an exterior and interior flange on each end of said casing, respectively, discs mounted within said flanges, the ends of said divided axle shaft fast in said discs, one of said discs provided with a concentric extension and with grooves on its inner side, the other disc provided with an eccentric wall on its inner side, an eccentric extension on said wall, a double eccentric member mounted over said extension and said wall, grooves provided on one end of said eccentric member, bearing rings provided on said double eccentric member, a coupling ring connecting said double eccentric member and the disc bearing said extension, said coupling ring provided with ribs on each side, the ribs on one side normal with those on the other, and outwardly projecting hubs on each of said discs, anti-friction bearings mounted on said hubs.

4. In a differential mechanism of the character described in combination with a driven shaft and a divided axle shaft, a casing, an exterior and interior flange on each end of said casing, respectively, discs mounted within said flanges, the ends of said divided axle-shaft fast in said discs, one of said discs provided with a concentric extension and with grooves on its inner side, the other disc provided with an eccentric wall on its inner side, an eccentric extension on said wall, a double eccentric member mounted over said extension and said wall, grooves provided on one end of said eccentric member, bearing rings provided on said double eccentric member, a coupling ring connecting said double eccentric member and the disc bearing said extension, said coupling ring provided with ribs on each side, the ribs on one side normal with those on the other, outwardly projecting hubs on each of said disc, anti-friction bearings mounted on said hubs, and a ring gear secured to said exterior flange meshing with a pinion gear secured to said driven shaft.

FERDINAND W. SEECK.